March 6, 1956  H. F. SWENSON  2,737,024
DISPENSING FREEZER

Filed Jan. 16, 1951  3 Sheets-Sheet 1

INVENTOR.
H. F. Swenson
BY
ATTORNEY.

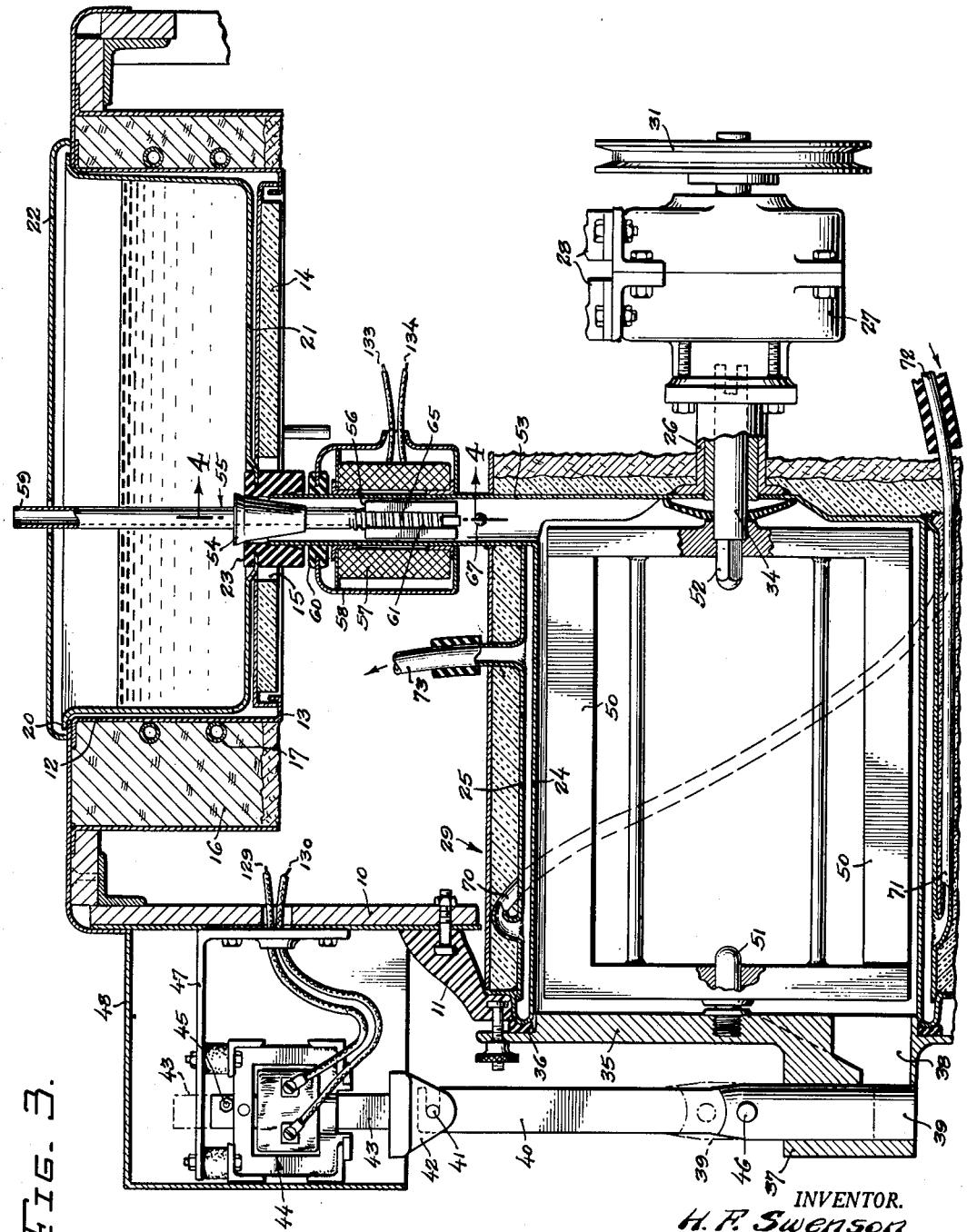

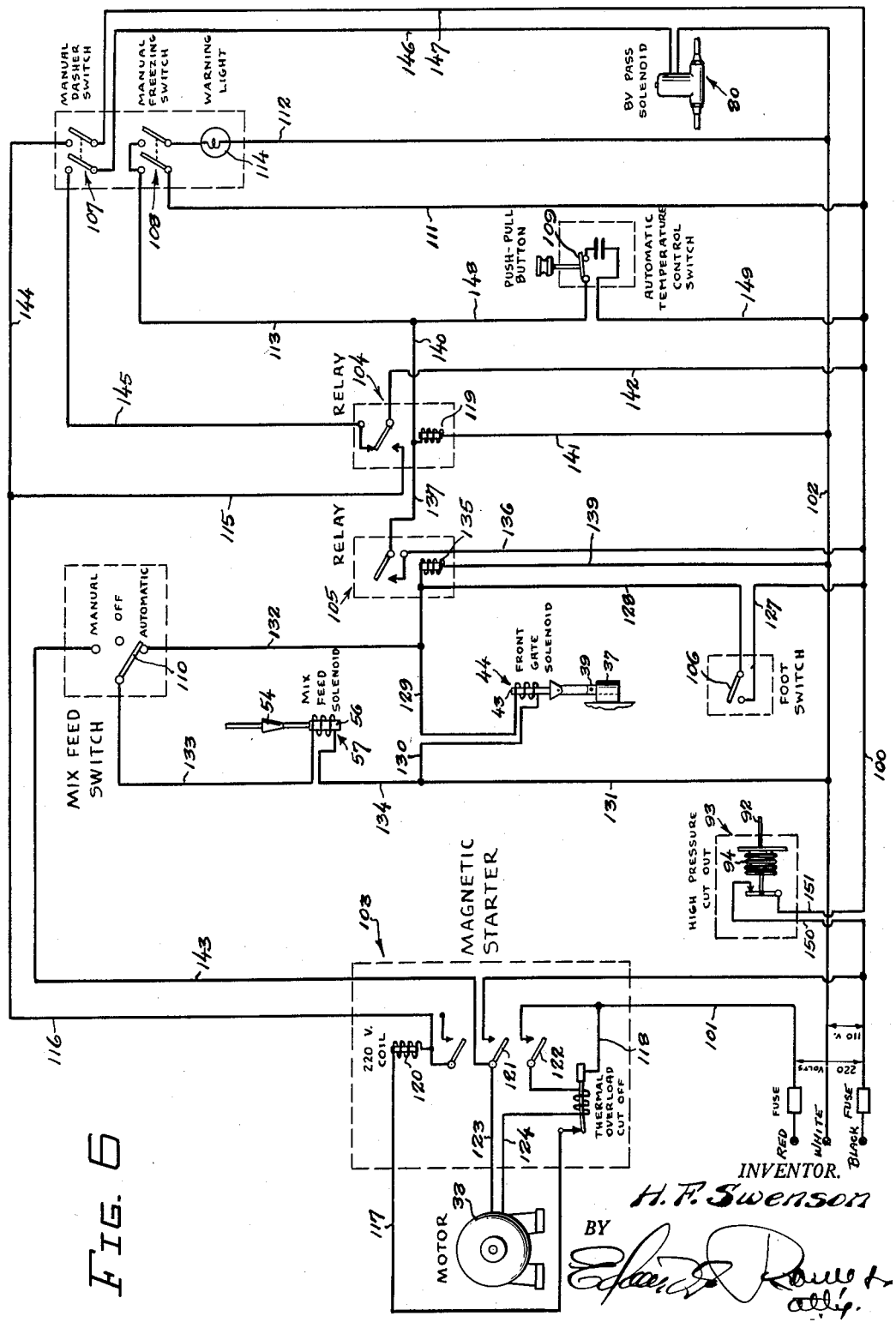

ated Mar. 6, 1956

2,737,024

DISPENSING FREEZER

Harvey F. Swenson, Seattle, Wash.

Application January 16, 1951, Serial No. 206,280

15 Claims. (Cl. 62—2)

This invention relates to a dispensing freezer of that general type illustrated and described in my pending application filed in the United States Patent Office July 18, 1949, Ser. No. 105,377, now Patent No. 2,604,307 issued July 22, 1952, and namely a freezer arranged to contain a custard or other like mix, and which acts to freeze this mix and dispense the same in individual servings.

In machines of this nature there is commonly provided a freezing cylinder housing a rotary dasher, and it has been the usual practice heretofore, to fill the cylinder with a suitable mix, condition the same for serving by freezing the mix and coincidently activating the dasher to whip air into the same, and then serving the conditioned mix. When the contents of the freezer have been entirely dispensed, a fresh charge of mix is introduced and this charge is similarly conditioned for serving. It necessarily follows with this type of equipment that at least two freezing cylinders must be employed if frozen custard is to be available for serving at all times, using one cylinder to freeze a fresh batch while frozen custard still remains in the other. Even so, where several waitresses are drawing off two cylinders, both cylinders frequently become depleted at the same time. Moreover, these prior machines have been manually controlled and require more or less constant attention if the product is to be held to even a fair degree of uniformity. It quite frequently happens, therefore, that the dispensed custard is unduly soft at times and unduly hard at other times.

The general object of the present invention is to devise a perfected dispensing freezer in which replenishing mix is charged to the freezing cylinder automatically as each of a succession of servings are dispensed, hence permitting a single freezing cylinder to do the work of two insofar as assuring a constant supply of frozen custard, which additionally is controlled automatically for an assured uniform conditioning of the product, and hence requires only nominal attention of an operator, and which, however, in recognition of the fact that manual control becomes advantageous on occasion, is so engineered as to permit the automatic system to be inactivated at will and allow the necessary controls to be then operated by hand.

Other more particular objects and advantages will, together with these general objects, appear and be understood in the course of the following description and claims, the invention consisting in the novel construction and in the adaptation and combination of parts hereinafter described and claimed.

In the accompanying drawings:

Fig. 3 is a fragmentary longitudinal vertical section drawn to a yet larger scale on line 3—3 of Fig. 2.

Fig. 6 is a diagrammatic view of electrical circuits employed in the machine.

Figure 1:
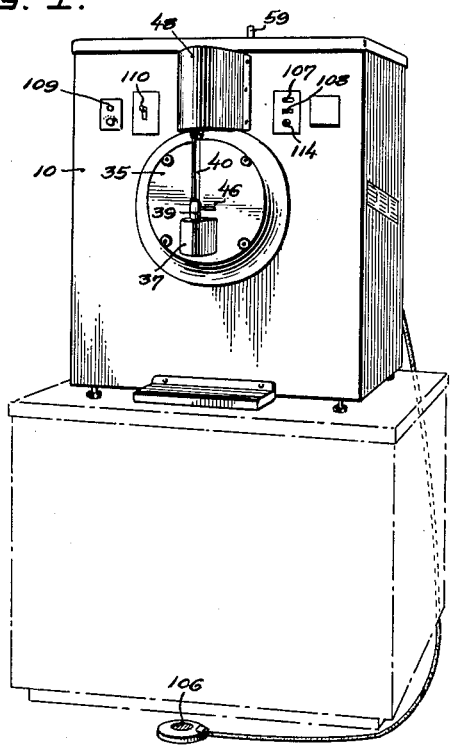
Figure 1 is a perspective front view of a machine embodying the teachings of the present invention, indicated as being mounted upon a subjacent storage cabinet shown by dotted lines.

The working mechanism of the present invention is desirably housed in a cabinet of ordinary or suitable construction indicated in the drawing as being open to the back and closed along the front, sides, and top. The front wall is designated by the numeral 10 and provides a more or less centrally located opening, circular in shape, circumscribed by a fixedly secured and forwardly projecting flared insulating collar 11, and in the top wall there is provided a relatively large opening, rectangular in shape, which is outlined by a rather deep hollow-walled jacket the inner shell 12 of which is inturned at the bottom to present a circumscribing and upwardly lipped ledge 13. An insulated removable floor 14 providing a center opening 15 rests upon this ledge. The jacket is filled with a body 16 of insulating material and also houses a cooling coil 17 which is placed in direct contact with said inner shell 12, the two ends of the coil being exposed for connection with conduits 18 and 19. In a manner which will hereafter become apparent refrigerant gas in a moderately cold condition, preferably Freon, is fed by said conduits to and from the coil after having previously performed a primary refrigerating function.

The floor 14 and the jacket define a substantial well, and hung by a flange 20 in this well is a tank 21 closed at the top by a removable cover 22. Holes punched in both the bottom wall of the tank and in the cover are each vertically aligned one with the other and with the opening 15 provided in the well's removable floor 14, and removably fitted in said bottom hole of the pan is a rubber grommet 23, the pan being so formed as to locate the upper surface of the grommet flush with the bottom wall. The tank serves as a reservoir for mix which is to be delivered to a freezing cylinder designated generally by 29, and the manner of discharge will be later described.

The cylinder is a hollow-walled structure composed of spaced inner and outer shells 24 and 25 joined at the ends by weld seams. In its general construction, the cylinder is much the same as that illustrated and described in my above-identified co-pending application, being of uniform diameter throughout and having a full-width opening at the front. At the back there is provided a rearwardly extending tubular prolongation 26, and this prolongation derives support from a gear box 27 which is in turn rigidly supported by hangers 28 from a cross-bar 30 which is made a fixed part of the cabinet. Reduction gears contained in the gear box are powered by a pulley 31 driven by a belt 32 off an electric motor 33, and driven from these gears is a jack-shaft 34 which projects into the cylinder and takes it journal from a bushing fitted in the prolongation 26. The front end of the cylinder receives its support from the insulating collar 11. There is provided a removable freezer-front 35 which presents an annular boss fitting closely within the open front of the cylinder, and this freezer-front, taking its purchase from the collar, clamps firmly against a gasket 36 which in turn bears upon the end of the freezer cylinder. The freezer front presents a forwardly projecting nose 37 in which there is provided a vertical through-bore, and leading through a side-wall port into this bore is a feed channel 38 open to the interior of the cylinder. A solid cylindrical plunger valve 39, hereinafter termed a gate, is journaled for endwise sliding movement in said bore and in the normal low extreme of its permitted travel occupies a port-closing position with the bottom face lying flush with the bottom surface of the nose. A link 40 is pivotally attached to the gate, and this link hooks by its upper end over a pin 41 extending between the two arms of a fork 42 which is rigid with the core 43 of a solenoid unit 44. Being relatively heavy, the gate moves by gravity into its port-closing position, a movement which is limited by a stop 45, and is raised into its port-opening position by an energizing of the solenoid. The solenod unit hangs from a bracket 47 fixed to the front wall of the cabinet and is housed within a suitable cover 48. The valve may be also operated by hand, and for this purpose there is provided a pin 46 projecting laterally from the upper exposed end of the valve.

A dasher having the usual spirally developed blades 50 is provided within the freezing cylinder, being supported at the front by a journal-pin 51 and presenting at the rear a squared socket into which a mating squared end 52 of the jack-shaft 34 fits.

Made an integral part of the freezer cylinder and leading into the rear end thereof there is provided an upstanding tubular pipe 53 which is open at the top and has an outside diameter very slightly exceeding the inside diameter of the grommet 23. This pipe, or which is to say the head end thereof, is caused to be invested by the grommet when the tank is introduced to the well, thus bringing the bottom or discharge opening of the tank into communication with the interior of the freezing cylinder. As a closure valve for this bottom opening there is provided a conical stopper 54. The stopper is fast to a stem 55 of less diameter than the pipe, and one end of this stem depends into the pipe while the other end 59 extends upwardly through the opening which is provided in the tank cover 22. Received upon and made longitudinally adjustable with respect to said lower end of the stem is a soft-iron slug 56 serving as the movable core of a solenoid. The coil winding of this solenoid is designated by 57, and is carried within a casing 58 finding a slip fit upon the pipe and arranged by the grip of a rubber grommet 60 to be frictionally set thereon. The solenoid is contained in a normally open electric circuit, hereinafter to be described, and acts when energized to raise the core and responsively open the valve. The core is split to present an open longitudinal slot 61 and has a smooth bore interrupted at a point diametrically opposite the slot by a longitudinal groove 62. To permit the core to be set in longitudinally adjusted position upon the stem, and by such token governing the effective opening of the valve 54, a spring leaf 63 is received in this groove with its extremities hooked over the top and bottom ends of the core, and presents at its midlength a pawl-like projection 64 arranged to work in a round-thread screw 65 presented at the lower end of the stem. The pipe within the range of the core's vertical movement is punched inwardly to provide one or more nodular projections 66 projecting into said slot 61 to hold the core against rotation relative to the pipe, and at a point located immediately below this range and diametrically opposite the projections 66 there is provided another nodular projection 67 which serves as a safety stop in preventing the core from dropping into the freezing cylinder should the same become disengaged from the stem. The stem 55 is hollow and the significance thereof is that the interior of the freezing cylinder is constantly exposed to the atmosphere, hence allowing air to be whipped by the dasher into the mix delivered to the cylinder.

Figure 2:
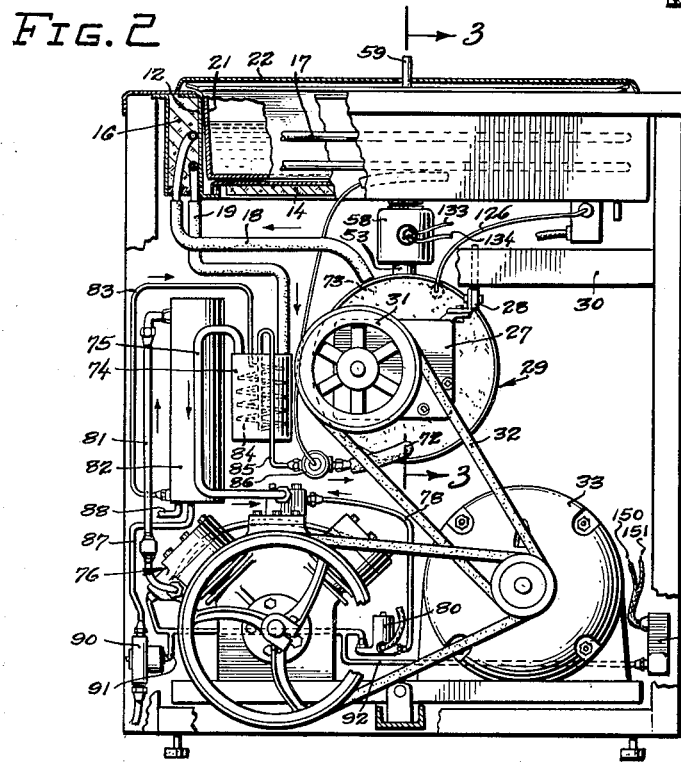
Fig. 2 is an enlarged rear elevational view of the machine, with parts of the framework broken away.
Figure 4:
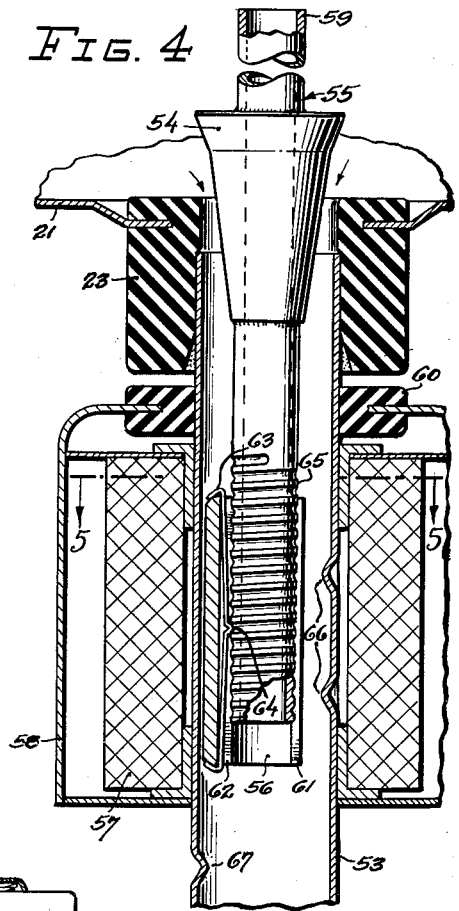
Fig. 4 is a fragmentary transverse vertical sectional view drawn to a still larger scale on line 4—4 of Fig. 3.
Figure 5:
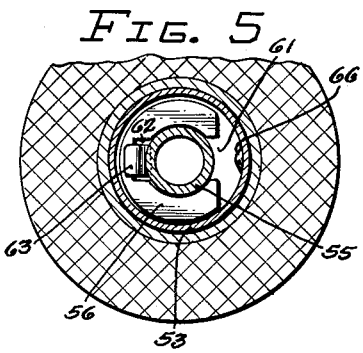
Fig. 5 is a fragmentary horizontal section on line 5—5 of Fig. 4.

Proceeding now to describe the refrigeration circuit, it will be seen from an inspection of Figs. 2 and 3 that the hollow shell of the freezing cylinder is fed top and bottom by branches 70 and 71 leading off a supply pipe 72, and that developing gases escape through an emission pipe 73. The gases entering this emission pipe pass by the conduit 18 into the coil 17 and thence are fed by conduit 19 into a heat-exchanger 74 wherefrom the same are carried by a pipe 75 into the low-pressure side of a compressor 76. It is a feature of the present invention that this compressor and the dasher of the freezing cylinder are each driven from the same source, and namely the motor 33. There is a self-evident advantage in using a single motor for performing both of these necessary driving functions but for efficient operation of the machine it becomes necessary that provision be made for driving the dasher independently of the compressor and if this problem were to be met by the utilization of a clutch between the motor and the compressor there would be little if any advantage, in point of reduced manufacturing costs and servicing requirements, over the use of independent motors. In the present system I have answered the problem by connecting the low-pressure to the high-pressure side of the compressor by a by-pass line 78 which contains a normally closed valve (not shown), and for the operation of this valve there is provided a solenoid 80 which I will hereinafter term the by-pass solenoid. From the high-pressure side, the refrigerant feeds through a pipe 81 into a water-cooled condenser 82 and from the condenser feeds by a pipe 83 into a coil 84 contained in said heat-exchanger 74. From the coil the refrigerant feeds by a pipe 85 to an expansion valve 86 and thence through the supply pipe 72 to the freezing cylinder, which completes the circuit. Cooling water for the condenser enters and leaves through pipes 87 and 88, respectively, with the flow controlled by a regulating valve 90 governed, through a branch pipe 91, by the pressure obtaining on the high-pressure side of the compressor. From said high-pressure side of the compressor another branch 92 leads to a cut-out 93 and there acts upon a diaphragm 94 (Fig. 6), the diaphragm responding to a pressure condition of predetermined magnitude to open a cut-out switch 96 contained in an electric circuit which is a salient part of the present invention. Within this circuit, which is a 3-wire 220 v. circuit, there is also contained the motor 33, a magnetic starter 103 therefor, the three solenoids 44, 57, and 80, relays 104 and 105, and manually operated switches 106, 107, 108, 109 and 110. Switch 106 is a foot-operated switch occupying a position upon the floor to the immediate front of the cabinet. Switches 107 and 108 are 2-position two-pole switches operating as respects the former to manually activate the dasher and as respects the latter to establish operation of the freezing system. Switch 109 is a single pole 2-position switch serving when closed to introduce an automatic temperature control. Switch 110 is a 3-position single pole switch movable from an inactive position into either of two operating positions, selectively, with one of said operating positions permitting manual and the other of said operating positions establishing automatic control of the mix feed.

It is thought that the wiring hook-up can be most clearly followed by tracing the several operations to which the present machine admits. Let it be assumed that the freezing cylinder is empty. The operator fills the tank 21 with the mix and initially charges the cylinder therefrom by unseating the stopper 54, either by manually lifting the exposed end 59 of the stem or by moving switch 110 to its "manual" position. It now becomes desirable to establish a comparatively rapid freeze in order to quickly bring the mix to a serving condition and this is accomplished by closing the manual freezing switch 108. An electric circuit is responsively established from hot line 100, passing through the switch from lead line 111 to a lead line 113 and thence by a lead line 140 to the activating coil 119 of the relay 104, returning by lead line 141 to the neutral 102. The energized coil changes the contact of the relay and completes a circuit from hot lines 100 and 101 through the activating coil 120 of the magnetic starter 103, the current passing through leads 142, 115, 116, 117 and 118. The responsive closing of the magnetic switches 121 and 122 closes a 220 v. circuit from hot lines 100 and 101 through the motor 33 and both the compressor and the dasher then operate. A second lead line 112 returning from the switch 108 to the neutral 102 coincidently energizes a warning light 114.

After this quick freezing has progressed for the comparatively short time interval necessary to bring the custard within the freezing cylinder to a suitable condition for serving, the operator opens switch 108 and closes the push-button switch 109 to introduce the automatic temperature control. Such temperature control finds thermal connection with the freezing cylinder by a gas-filled pipe 126 (Fig. 2). The operator, for normal operation, also at this time moves switch 110 to "automatic" position. As the thermally responsive switch of the temperature control cuts in and out, it closes and opens a circuit by lead lines 149, 148, 140 and 141 through said activating coil of the relay 104 to automatically control the energizing of the motor according as the condition of the frozen custard requires.

As successive calls now arise for servings of the frozen custard the operator simply steps upon the foot switch 106, and circuits are simultaneously closed through each of the two solenoids 44 and 57, common lead lines 127, 128 and 131 acting with connecting leads 129 and 130 to complete a circuit through the former said solenoid and acting with connecting leads 132, 133, 134, and the switch 110 to complete a circuit through the latter solenoid. Also closed by the foot switch coincident with the closing of the circuit to the solenoid 44 is another circuit passing through the activating coil 135 of the relay 105, this circuit drawing current by lead line 128 from hot wire 100 and returning by a lead line 139 to the neutral 102. The energized coil changes the contact of the concerned relay and closes a circuit through lead lines 136, 137 and 141 to the activating coil 119 of the relay 104, and it thus follows that the motor, irrespective of the temperature condition obtaining within the freezing cylinder, is caused to be energized automatically in response to each operation of the foot switch. This is an essential action in order that the dasher will turn and act by its spirally developed blades 50 to push the frozen custard forwardly within the cylinder toward the delivery spout as the solenoid 44 opens the discharge gate. As the custard is discharged into receiving cups held below the spout, the simultaneous opening of the stopper 54 causes replenishing mix to enter the rear end of the freezing cylinder through the feed pipe 53. It is significant that switch 106 is a foot switch, leaving both hands free to hold the receiving cups.

Toward the close of a business day it perforce becomes desirable to dispense from the cylinder without replenishing the mix and the operator then moves switch 110 to its "off" position. This isolates solenoid 57, and operation of the foot switch 106 will now energize the solenoid 44 independently of the solenoid 57.

On occasions it becomes desirable to cause the dasher to turn without at the same time circulating refrigerant through the cylinder, as for example when it is desired to whip added air into the mix, or when the cylinder is being cleared toward the close of a business day or when water is introduced to the cylinder and the dasher employed as an aid to cleaning. To accomplish this end the button switch 109 is opened to inactivate the automatic temperature control and dasher switch 107 is closed. This completes two separate circuits, one from hot wire 100 through lead line 146 to the by-pass solenoid 80, returning by a connecting lead to the neutral 102. The second circuit is through the other pole of switch 107, which acts by lead lines 147, 144, 116, 117, and 118 to close a circuit through coil 120 of the magnetic starter and responsively complete the motor circuit. As the motor now operates, it acts through the gear box to drive the dasher and also turns the crank shaft of the compressor but inasmuch as the solenoid 80 has opened the by-pass line 78 the suction pull of the compressor simply draws refrigerant from the high to the low side to establish a localized circulation having no effect upon the refrigeration system as a whole.

The invention and the manner of its operation should be apparent from the foregoing. From the standpoint of of sanitation, the coil 17 holds the replenishing mix within the supply tank 21 in a cold condition, and all parts with which the mix comes in contact may be easily and effectively cleaned. For cleaning the supply tank and its associated valve 54, the operator lifts the tank out of its receiving well, disassembles the valve structure by pulling the armature core 56 off the stem, dislodges the leaf spring 63 from the freed core, and removes the grommet 23. These separated parts, after washing, can be quickly reassembled. The interior of the freezing cylinder can be effectively cleaned by flushing with hot water although it may be desirable to occasionally scour the same, for which purpose the freezer front 35 is made easily removable. To remove the plunger gate for cleaning the discharge spout, the link 40 is simply unhooked from the solenoid core and the gate lifted out of the bore in which it works.

In connection with the use of a single motor to drive both the compressor and the dasher, it is to be noted that when the mix is liquid and warm the refrigeration load is high but the dasher load is low. Conversely, upon a lowering of the temperature of the mix, the effort required to turn the dasher so as to move the congealed mix rises very appreciably but there is then a substantial reduction in the load which the compressor places upon the motor. An approximate balance thus exists between the demands placed by the dasher and by the compressor upon the motor throughout a cycle of the freezer's operation. The single motor which I employ requires, therefore, a load capacity little more than would be required for each of two motors were two separate motors to be employed, one for the dasher and one for the compressor. This necessarily follows in that each such separate motor would perforce have to be of a size to handle the maximum load which it is called upon to carry even though the motor would be required to handle this maximum load for only a comparatively short period of time, and namely during the initial stage of the machine's working cycle in the instance of the compressor motor and during the late stage of the machine's working cycle in the instance of the dasher motor. The use of two motors thus means a combined load capacity which is very nearly double the capacity which my double-duty single motor requires.

While I have illustrated and described the now preferred embodiment of the invention it will be apparent that changes may be resorted to without departing from the spirit of the invention. I accordingly intend that no limitations be implied and that the hereto annexed claims be given a scope fully commensurate with the broadest interpretation to which the employed language admits.

I claim:

1. In a dispensing freezer, and in combination with a freezing cylinder and with an associated tank containing a replenishing supply of the mix which is to be frozen in the cylinder, a discharge opening from the cylinder for dispensing the frozen mix, a valve for said opening, an electrically operated device for opening said valve, an electrically operated device for delivering replenishing charges of mix from the tank to the cylinder, separate normally incomplete electric circuits for each of said electrically operated devices, and selectively employed switches for closing said circuits so wired in the circuits as to permit the electrically operated devices to be activated either simultaneously or one independently of the other.

2. In a dispensing freezer, a freezing cylinder, a refrigeration circuit for said freezing cylinder providing a compressor and having a normally closed line by-passing the cylinder and leading from the high-pressure side to the low-pressure side of the compressor, a dasher mounted for turning motion within the cylinder, an electric motor having driving connection both with the compressor and with the dasher, an electric circuit for the motor including a normally open circuit-closing switch, and two alternatively employed normally open electric circuits acting when closed to responsively close the switch for the motor circuit, each of said last-named circuits including a circuit-closing switch and one of said last-named circuits also including an electrically operated device for opening the by-pass line of the refrigeration circuit.

3. In a dispensing freezer, a freezing cylinder, a refrigeration circuit for said freezing cylinder providing a compressor and having a normally closed line by-passing the cylinder and leading from the high-pressure side to the low-pressure side of the compressor, a normally inactive solenoid operative when energized to open said by-pass line, a dasher mounted for turning motion within the cylinder, an electric motor having driving connection both with the compressor and with the dasher, an electric circuit for the motor including a normally open circuit-closing switch, and two alternatively employed normally open electric circuits acting when closed to responsively close the switch for the motor circuit, each of said last-named circuits including a circuit-closing switch and one of said last-named circuits also including the solenoid.

4. In a dispensing freezer, a horizontally disposed freezing cylinder having an opening at its front end for the delivery of mix frozen in the cylinder, a normally closed valve for said opening, a mix-containing tank supported above the cylinder and providing a bottom discharge opening, a pipe leading downwardly from the bottom opening of the tank into the rear end of the cylinder, a normally closed valve for said discharge opening, a dasher mounted for rotation in the cylinder and presenting a longitudinally extending blade acting to scrape the wall of the cylinder and tracing the locus of a spiral developed about the axis of the cylinder, an electric motor, an electric circuit for the motor including a circuit-closing switch, driving connection from the motor to the dasher acting, when the motor is energized, to turn the dasher in such a direction as will cause the same to push frozen mix forwardly toward the front end of the cylinder, independent electrically operated means for opening the two closure valves, an electric circuit for said valve-opening means including a manually operated circuit-closing switch, and a separate electric circuit also completed by the closing of said last-named switch and including an electrical device operative when activated to close the switch for the motor circuit.

5. In a dispensing freezer, a cylinder for freeze-conditioning the substance which is to be dispensed, a refrigeration circuit for said freezing cylinder providing a compressor and having a normally closed line by-passing the cylinder and leading from the high-pressure side to the low-pressure side of the cylinder, a normally inactive solenoid operative when energized to open said by-pass line, a dasher mounted for turning motion within the cylinder, an electric motor having driving connection both with the compressor and with the dasher, a normally open electric circuit for the motor, and three alternatively employed normally open electric circuits each acting when closed to close the motor circuit and in the instance of one said circuit including two circuit-closing switches in series one of which is manually operated and the other opened and closed automatically by temperature conditions obtaining within the cylinder, in the instance of a second said circuit including a manually operated circuit-closing switch and a warning light, and in the instance of the third said circuit also including a manually operated circuit-closing switch together with the by-pass solenoid.

6. In a dispensing freezer, a hollow-walled freezing cylinder having an opening at one end for discharging mix which has been freeze-conditioned in the cylinder, a closure valve for said discharge opening, a normally inactive solenoid operative when energized to open said valve, a mix-containing tank supported above the cylinder and providing a bottom opening, a cooling coil surrounding said tank, a pipe feeding by gravity from the bottom opening of said tank into the end of the freezing cylinder opposite the first-named or discharge opening, a closure valve for said bottom opening controlling the admission of mix from the tank to the cylinder, a normally inactive solenoid operative when energized to open said admission valve, a dasher mounted for turning motion within the cylinder, a refrigeration system including a compressor acting in its normal operation to circulate refrigerant first through the hollow walls of the freezing cylinder and then through the coil and providing a normally-closed line by-passing the cylinder and coil and leading directly from the high-pressure to the low-pressure side of the compressor, an electrically operated means for opening said by-pass line, an electric motor having driving connection both with the compressor and with the dasher, a normally open electric circuit for the motor, three alternatively employed electric circuits each acting when closed to close the motor circuit, one of said three circuits being opened and closed by two switches in series one of which switches is operated by hand and the other operated automatically by temperature conditions obtaining within the cylinder, another of said three circuits including a warning light and being opened and closed by a manually operated switch, and the third of said three circuits including the electrically operated means for opening the by-pass line, and a normally open electric circuit, including a manually operated circuit-closing switch, made common to both the discharge solenoid and the admission solenoid for energizing the latter in concert.

7. Structure according to claim 6 in which the electric system contains another normally incomplete electric circuit including the admission solenoid and provides a manually operated switch for closing this circuit and at the same time isolating the admission solenoid from the circuit which includes the discharge solenoid, thus to allow the admission and discharge solenoids to be energized independently.

8. Structure according to claim 7 in which the electric system provides still another normally incomplete electric circuit the closing of which simultaneously closes the motor circuit and which is caused to be completed coincident with a closing of the circuit to the discharge solenoid, hence causing the dasher to be driven whenever the discharge valve is opened.

9. In a dispensing freezer, a freezing cylinder having a discharge opening, a closure valve for said opening, electrically operated means for opening said closure valve, a dasher received within the cylinder and operating when activated to move frozen mix contained within the cylinder toward the discharge opening, an electric motor for driving the dasher, separate normally incomplete electric circuits for said electrically operated valve-opening means and for the motor and each including a manually operated control switch the closing of which responsively closes the related circuit, and means functional upon the motor circuit independently of the manually operated control switch therefor and causing the motor circuit to be closed automatically in concert with a closing of the control switch related to said valve-opening means.

10. In a dispensing freezer, a horizontally disposed open-front freezing cylinder, a freezer-front closing said opening, said freezer-front presenting a forwardly projecting nose having a bore extending vertically therethrough and providing a port in the side wall of said bore exposed to the interior of the cylinder, a plunger gate received for endwise sliding movement in said bore, a solenoid unit having its armature core above and vertically aligned with said bore, said core being connected with the upper end of said plunger gate and acting when the solenoid unit is energized to raise the gate from a normal port-closing into a port-opening position, a normally incomplete electric circuit for the solenoid unit, and a manually operated switch for closing said circuit.

11. In a dispensing freezer, a freezing cylinder, a mix-containing tank supported above the cylinder and providing a delivery opening in its bottom wall, a vertical pipe having its upper end registering with the delivery opening and feeding by its lower end into the interior of the cylinder, a conical stopper valve acting in its normal position to seat upon and close said delivery opening, a valve stem fast to the stopper valve and projecting axially below the latter into the pipe, an armature core carried by the lower end of the valve stem, a solenoid coil carried upon the outside of the pipe and acting when energized to raise the core and responsively unseat the stopper valve, a normally open electric circuit for the solenoid, and a manually operated switch for closing said circuit.

12. A freezer assembly as defined in claim 11 in which the armature core is threaded upon the valve stem, the pipe providing means arranged to engage the introduced core and hold the latter against rotation to enable the core to be adjusted axially with respect to the stem by the act of turning the stem.

13. In a dispensing freezer, and in combination with a freezing cylinder having a dasher therein, a mix-containing tank supported above the cylinder and providing an opening in its bottom wall, a rubber grommet removably fitted in said opening, a vertical pipe having its upper end snugly invested by the grommet and feeding by its lower end into the interior of the cylinder, a conical stopper valve acting in its normal closed position to seat upon the grommet, and a valve stem made fast to the stopper valve and projecting above and below the latter with the upper end extending above the level of the mix contained in the tank, the stem being hollow and open at both ends for supplying air to the interior of the freezing cylinder.

14. Structure according to claim 13 in which the lower end of the stem projects well below the valve and is externally threaded, a center-bored split armature core received over said threaded portion of the stem and providing an internal slot located opposite the split, a spring leaf fitting in said slot with its ends removably clipped over the ends of the core and presenting intermediate the ends a projecting pawl yieldingly urged by the spring characteristic of the leaf into engagement with the threads of the stem, the wall of the pipe being deformed inwardly to present a nodular process arranged to project into the split of said core and hold the latter against rotation relative to the pipe, thus allowing the core to be adjusted axially upon the stem by turning movements given to the stem, a solenoid complement of said armature core carried upon the outside of the pipe and acting when energized to raise the core and responsively unseat the stopper valve, a normally open electric circuit for the solenoid, and a manually operated switch for closing said circuit.

15. In a dispensing freezer, a horizontally disposed freezing cylinder having an opening at its front end for the delivery of mix frozen in the cylinder, a normally closed valve for said opening, a pipe for the delivery of replenishing mix leading to the rear end of the cylinder, a normally closed valve governing the delivery of replenishing mix through said delivery pipe, a dasher mounted for rotation in the cylinder and presenting a longitudinally extending blade tracing the locus of a spiral developed about the axis of the cylinder, an electric motor, an electric circuit for the motor including a circuit-closing switch, driving connection from the motor to the dasher acting, when the motor is energized, to turn the dasher in such a direction as will cause the same to push frozen mix forwardly toward the front end of the cylinder, independent electrically operated means for opening the two closure valves, an electric circuit for said valve-opening means including a manually operated circuit-closing switch, and a separate electric circuit also completed by the closing of said last-named switch and including an electrical device operative when activated to close the switch for the motor circuit.

References Cited in the file of this patent

UNITED STATES PATENTS

| | | |
|---|---|---|
| 1,351,302 | Sanna | Aug. 31, 1920 |
| 1,495,125 | Willmann | May 20, 1924 |
| 1,504,756 | Hammill | Aug. 12, 1924 |
| 1,693,677 | Swift | Dec. 4, 1928 |
| 1,783,864 | Vogt | Dec. 2, 1930 |
| 1,874,718 | Tyson | Aug. 30, 1932 |
| 1,951,365 | Morrow | Mar. 20, 1934 |
| 1,993,130 | Ballew | Mar. 5, 1935 |
| 2,000,730 | Wortmann | May 7, 1935 |
| 2,059,485 | Payne | Nov. 3, 1936 |
| 2,099,253 | Bagby | Nov. 16, 1937 |
| 2,211,387 | Routh | Aug. 13, 1940 |
| 2,327,355 | Kliest | Aug. 24, 1943 |
| 2,328,810 | Johnson | Sept. 7, 1943 |
| 2,446,156 | Kolz | July 27, 1948 |
| 2,515,722 | Maranz | July 18, 1950 |
| 2,523,853 | Woodruff | Sept. 26, 1950 |
| 2,527,894 | Tacchella | Oct. 31, 1950 |
| 2,535,462 | Stoelting | Dec. 26, 1950 |
| 2,559,032 | Tacchella | July 3, 1951 |